United States Patent [19]

Takei et al.

[11] Patent Number: 4,829,386
[45] Date of Patent: May 9, 1989

[54] VIDEO IMAGE RECORDING APPARATUS

[75] Inventors: Masahiro Takei, Yokohama; Makoto Takayama, Kawasaki, both of Japan

[73] Assignee: Canon Kabushiki Kaisha, Tokyo, Japan

[21] Appl. No.: 716,244

[22] Filed: Mar. 26, 1985

[30] Foreign Application Priority Data

Mar. 30, 1984 [JP] Japan .................................. 59-64959

[51] Int. Cl.$^4$ .......................... H04N 5/76; G01D 9/00
[52] U.S. Cl. ................................. 358/336; 346/33 R; 358/296
[58] Field of Search ............... 358/335, 336, 296, 298, 358/906, 314, 337, 339, 320, 213.15; 360/35.1, 38.1, 33.1; 346/33 R

[56] References Cited

U.S. PATENT DOCUMENTS

| | | | |
|---|---|---|---|
| 4,106,061 | 8/1978 | Burnett | 358/296 |
| 4,220,971 | 9/1980 | Lambeth | 358/336 |
| 4,325,086 | 4/1982 | Sato et al. | 358/296 |
| 4,394,662 | 7/1983 | Yoshida et al. | 358/298 |
| 4,422,102 | 12/1983 | Tamura | 358/296 |
| 4,591,921 | 5/1986 | Nakajima | 358/296 |

Primary Examiner—Alan Faber
Attorney, Agent, or Firm—Fitzpatrick, Cella, Harper & Scinto

[57] ABSTRACT

A video image apparatus which records an image corresponding to a video signal including synchronizing signals is disclosed. The apparatus includes a detector for detecting a lack of synchronizing signals and a controller responsive to the detector for inhibiting the record operation in order to cope satisfactorily with interruption of the input video signal. Preferably, the apparatus further includes a restart unit for restarting the recording operation from the position where the recording operation has stopped after the input video signal has been restored.

9 Claims, 6 Drawing Sheets

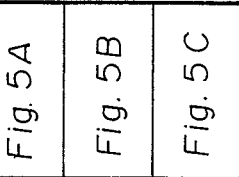
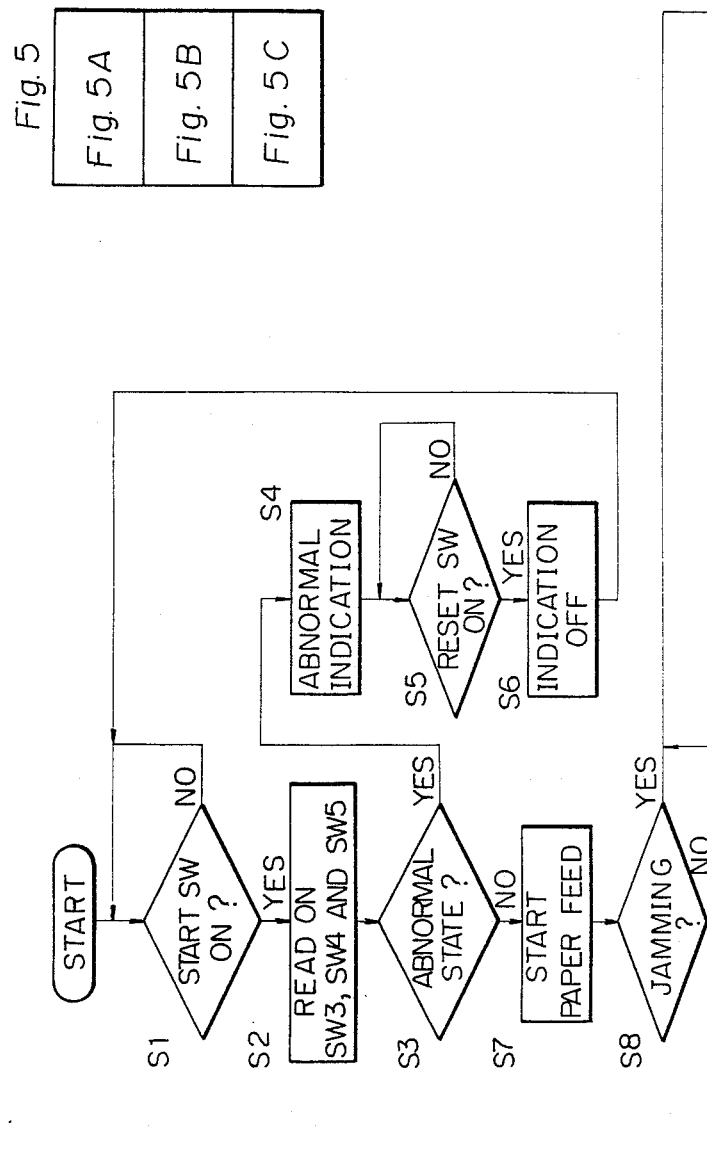

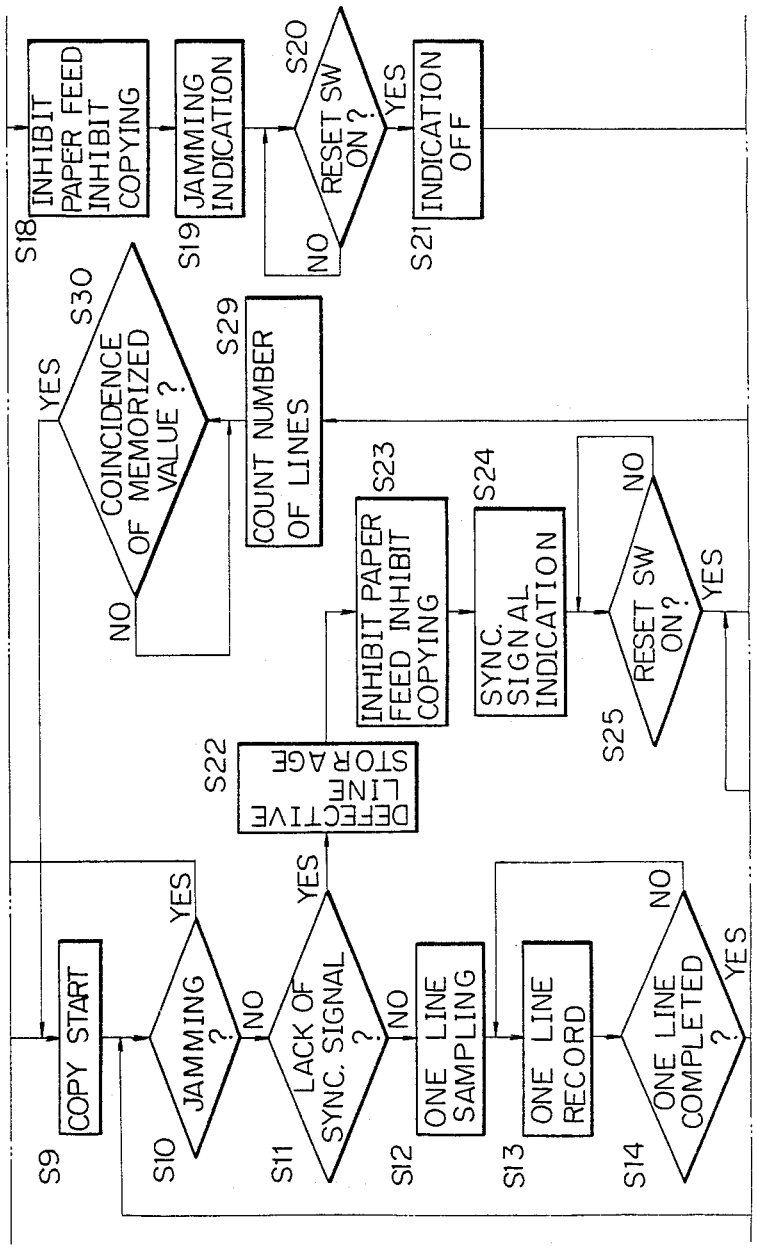

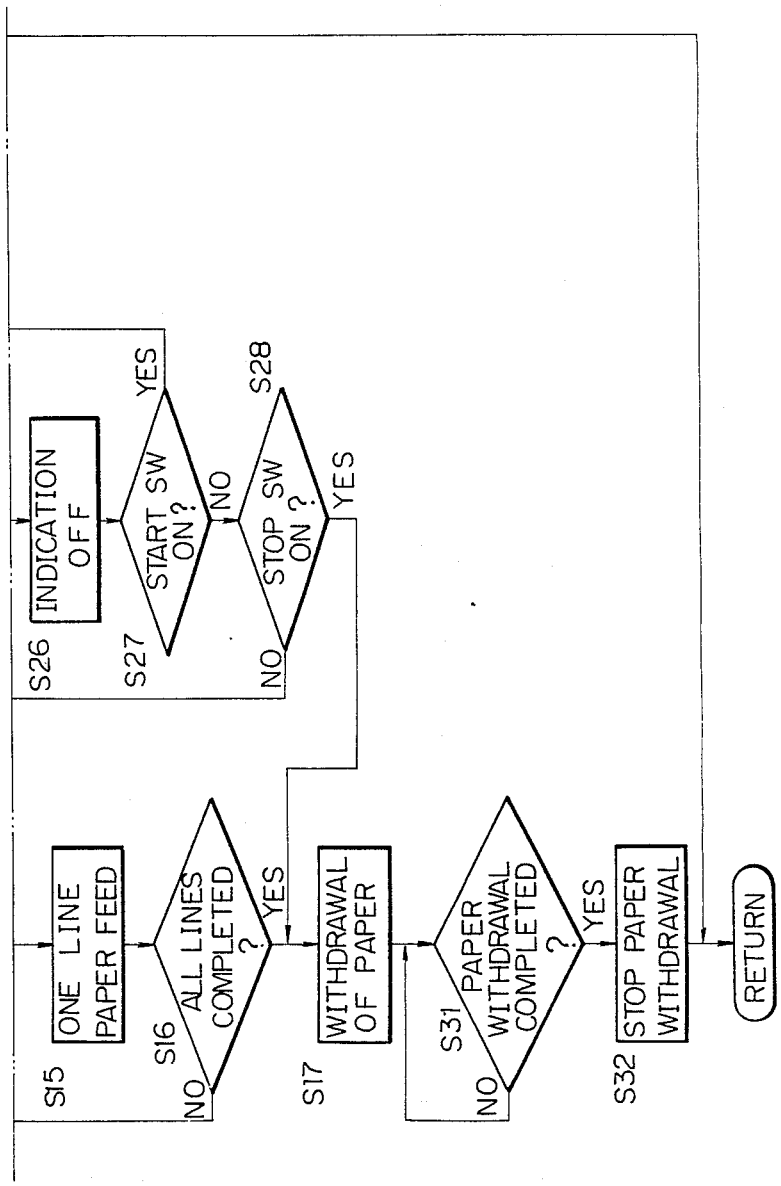

VIDEO IMAGE RECORDING APPARATUS

BACKGROUND OF THE INVENTION

1. Field of the Invention

The present invention relates to a video image recording apparatus which records a visible image corresponding to and derived from a composite video signal which contains synchronizing signals.

2. Description of the Prior Art

Recent development of video apparatus are so remarkable that VTRs, video disks, etc. have spread into domestic market. There are increased demands that the images derived from such video apparatus are not only displayed on a television set, but also printed out in a hard copy. In such a case, if all the video signals for one picture are stored in an image memory, a hard copy can be easily obtained using a printer.

The image memory for one picture, however, is very expensive. Also, the printer is expensive. If an inexpensive image memory which has a small capacity is used, the number of samples of an image signal or the number of bits derived at the A/D conversion must be decreased. Thus, the resolution of image is decreased and the quality of a printed image is remarkably degraded.

As a method of providing a hard copy without using an image memory for one picture, it has been proposed to sample a video signal with an appropriate number of sample dots by one or several lines or columns vertically or horizontally and to store the sampled signals into a memory while recording the sample signals.

According to this method, an image memory for several lines or columns or so will suffice. In this method, however, if, during printing operation, connection between the printer and a video source apparatus which includes a VTR, a video disk or the like is interrupted, or a power supply for the video source apparatus is erroneously turned off, the printer will end recording without recording anything into the recording medium. As a result, the recording medium will be discharged, thereby rendering a sheet of print useless.

SUMMARY OF THE INVENTION

The present invention is made in view of the above situations. An object of the present invention is to provide a new video image recording apparatus which can avoid the above disadvantage.

It is another object of the present invention to provide a new video image recording apparatus which only requires an inexpensive memory of small capacity but which can properly cope with an event such as accidental interruption of a video signal input to some without causing erroneous or improper operations.

Under these objects, according to the present invention, a video image recording apparatus which records an image corresponding to a video signal which contains synchronizing signals comprises sample means including a memory for sampling the video signal, recording means for recording an image corresponding to the memory output of said sample means in parallel with the sampling operation of said sample means, detection means for detecting a lack of the synchronizing signals, and control means responsive to said detection means for inhibiting the recording operation of said record means.

The above recording means, for example, includes an ink jet recording head and a carrier mechanism which carries the recording medium to the recording head. The control means inhibits operation of the carrier mechanism in response to the detection means.

According to a preferred embodiment, restart means are provided which reopens the recording operation of the recording means at the position where the recording means is stopped by said control means in response to the lack of synchronizing signals.

When the lack of synchronizing signals is detected, the position of the sampled line or column of video signal is stored. After the normal situation is restored, recording operation is restarted at the position of the sampled line or column stored. Storage of the position of the sampled line or column is possible by counting the number of sampled lines or columns, for example.

In addition to the memory means, the sample means includes a sample and hold circuit and an A/D converter which A/D converts the output of the hold circuit. The above memory stores the output of the A/D converter. The memory has a small capacity which stores sampled data for one or several lines or columns.

Thus, according to an aspect of the present invention, since detection means are provided for detecting a lack of synchronizing signals, included in an input video signal and the detection output stops the operation of the recording means, useless recording operation in response to interruption of the input video signal may be avoided as well as being able to perform a recording operation again on the same medium. Thus, waste of recording materials such as recording media and ink can be prevented.

The above and other objects, aspects and features of the present invention will be apparent from the following description of embodiments thereof with respect to the accompanying drawings.

BRIEF DESCRIPTION OF THE DRAWINGS

Now, preferred embodiments of the present invention will be described with respect to the drawings in which:

FIG. 5 consisting of FIGS. 5A through 5C are flowcharts illustrating a flow of operations following a program stored in the control circuit of FIG. 2.

DETAILED DESCRIPTION OF THE EMBODIMENTS

Figure 1:
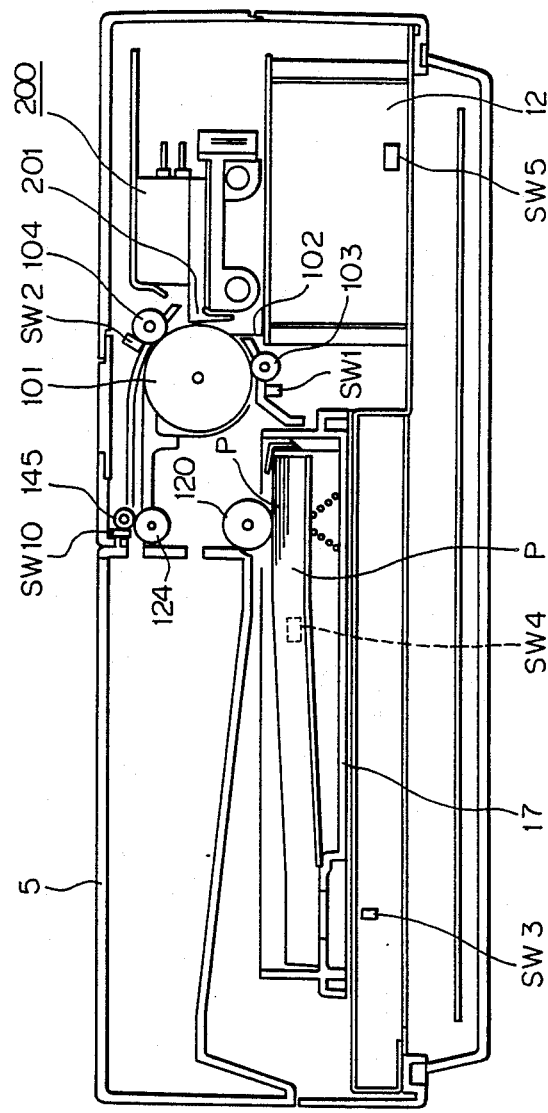
FIG. 1 is a sectional view of one embodiment of the present invention applied to an ink jet printer.

Reference is now made to FIG. 1 in which reference numeral 5 denotes a stacker which accommodates sheets of recording paper which are already recorded. Reference numeral 12 an ink cartridge which contains liquid recording ink. Reference numeral 17 denotes a feed cassette which accommodates a plurality of sheets (unrecorded) of recording paper, P. Reference numeral 101 denotes a platen roller. Reference numeral 102 denotes a press spring which pushes a sheet of recording paper, P, against the platen roller 101. Reference numerals 103, 104, 120 and 124 denote a resist roller, a pinch roller, a pick-up roller (paper feed roller) and a discharge roller, respectively. Reference numeral 200 denotes an ink jet head unit with an ink head array 201 being mounted at an end thereof.

The uppermost one of cut-like sheets of recording paper stacked within the feed cassette 17 is picked up by the pick-up roller 120 which rotates at its operating position, and pinched between the resist roller 103 now at rest and the platen roller 101. Since the sheet of recording paper, P, is fed by the pick-up roller 120, it loops between the pick-up roller 120 and the resist roller 103, and oblique motion, etc., of the sheet is corrected. The platen roller 101 then starts to rotate at an appropriate time. This causes the sheet of paper, P, to pass between the press spring 102 and the platen roller 101 and to be pinched between the pinch roller 104 and the platen roller 101. Under these conditions, an ink jet head array 201 reciprocates in directions normal to the introduced into a sample circuit 51 and a synchronizing signal separation circuit 57. The synchronizing signals separated by the separation circuit 57 are input into a timing signal generator 60 which outputs a sample timing signal ST on the basis of the input synchronizing signal. The sample circuit 57 samples the input video signal in accordance with the sample timing signal ST and outputs the sampled signals to an A/D converter 52 which digitizes the sampled analog analog signals. A process circuit 53 performs well-known image processings on the digitized video signals: color correction masking, $\gamma$ correction, contour emphasis, underlying color removal, black print forming, etc., and produces a final print output signal which is then stored in a line (or column) memory 53a in the process circuit 53. This stored data is then delivered to a D/A converter 54 in which the data is converted into an analog signal for each dot data. This analog signal is then applied to a printer head drive circuit 55. If the printer is of the ink-on-demand type, for example, appropriate voltages are applied to the respective actuators for piezoelectric elements, etc., in the ink jet heads of the head array 56 (201 in FIG. 1) corresponding to the respective colors (for example, yellow, magenta, cyan, black, etc.) to form and jet corresponding ink drops. When the head array 56 completes a record for one line or column, the sample circuit 51 performs the next sample operation. Thereafter, in the same way as above, recording for the next line or column is performed.

On the other hand, the timing signal generator 60 outputs a head drive timing signal DT on the basis of the horizontal synchronizing one of the synchronizing signals separated by the synchronizing signal separation circuit 57. The timing signal DT is delivered to the head drive circuit 55 to be used as a timing signal. The horizontal synchronizing signal HD from the synchronizing signal separation circuit 57 is also input to a horizontal synchronizing signal detection circuit 58 which detects a lack of horizontal synchronizing signals.

Reference numeral 59 denotes a paper jamming detection circuit which detects paper jams in accordance with the outputs of the switches SW1, SW2 and SW10. Sine the jam detection circuit 59 is well known in prior art copy apparatus, further description will be omitted. The respective outputs of the detection circuits 58, 59 and the switches SW3, SW4 and SW5 are input to a control circuit 65. When each of the detection circuits 58 and 59 and the switches SW3, SW4 and SW5 detects abnormality, it is arranged to change from "H (high level") to "L (low level)". The outputs of a start switch 66, a reset switch 67 and a stop switch 68 are also input to the control circuit 65.

The control circuit 65 controls the sample circuit 51, the process circuit 53, the head drive circuit 55, a carriage drive circuit 63, a display circuit 64 and a recording paper carrying circuit 69 on the basis of the 8 input signals. The carrying circuit 69 controls the movement of the pick-up roller 120, the platen roller 101 and the discharge roller 124. The control circuit may be composed of a microcomputer, for example.

Figure 3:
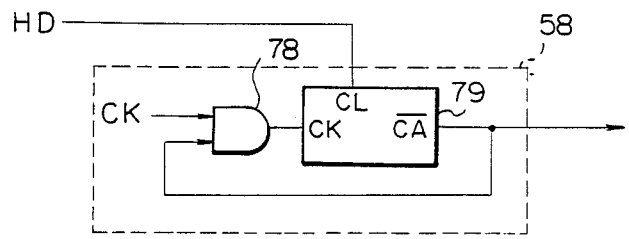
FIG. 3 is a partial circuit diagram illustrating the details of the synchronizing signal detection circuit of FIG. 2.
Figure 4:
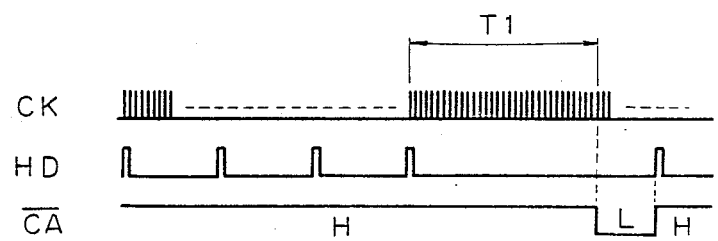
FIG. 4 illustrates signal waveforms at the respective points of the circuit of FIG. 3.

FIG. 3 illustrates the specific circuit of the synchronizing signal detection circuit 58. Reference numeral 79 denotes an adding counter which counts input clock pulses CK and which is cleared by an input horizontal synchronizing signal HD. The number of input clock pulses CK generated for each horizontal interval is 16 for example in the particular embodiment. Assume that the adding counter 79 is a 5-bit counter. When the counter 79 counts 32 clock pulses CK, the carry output $\overline{CA}$ of the counter 79 changes from "H" to "L". Normally, when horizontal synchronizing signals HD do not fail, the counter 79 is cleared halfway through its counting operation, thereby maintaning the carry output $\overline{CA}$ at "H". If two successive horizontal synchronizing signals HD fail, however, the carry output $\overline{CA}$ changes to "L". Thus, failure of the horizontal synchronizing signals HD is detected. In the particular embodiment, arrangement is made such that when two successive horizontal synchronizing signals HD fail, the carry output $\overline{CA}$ of the counter 79 changes to "L". Alternatively, the number of clock pulses CK produced within a single horizontal interval and/or the preset value of the counter 79 may be altered such that when at least one horizontal synchronizing signal fail, the carry output of the counter 79 changes to "L". In addition, in the particular embodiment, the adding counter 79 is used, but a retriggerable monostable multivibrator may be used instead.

FIG. 5 shows the arrangement of FIGS. 5A, 5B and 5C which illustrate a flow of operation following a program stored in the control circuit of FIG. 3.

When the start switch is turned on (step S1), the respective outputs of the abnormality detection switches SW3, SW4 and SW5 are read (step S2). When the presence of abnormality is detected (step S3), i.e. when no ink cartridge 12 is mounted or when no sheets of recording paper are put within the paper cassette 17, the occurrence of abnormality is indicated (step S4). After normality is restored and when the reset switch 67 is turned on (step S5), the indication of abnormality is turned off (step S6) and control returns to the start (step S1).

When no abnormality is detected (step S3), paper feed starts using paper carrying circuit 69 (step S7). When a sheet of recording paper, P, is fed to a predetermined position with no paper jam being produced, the carry drive circuit 63 and the head driver circuit 55 start a copying operation (step S9).

In the copy operation, first, a video signal is sampled for one line or column (step S12). Thereafter, a record for this line or column is completed (steps S13, S14), at which time the paper carrying circuit 69 feeds recording paper P by an amount corresponding to one line or column in the secondary direction (step S15). When the record for all the lines or columns is completed, the recording paper is discharged (steps S16, S17). Through the copy operation, detection of jam is performed in parallel with detection of a lack of synchronizing signals.

When occurrence of paper jam is detected by the detection circuit 59 (steps S8, S11), paper feed as well as copy operation is inhibited at that time (step S18), thereby performing a jam indication (step S19). When the jammed paper is removed and the reset switch 67 is turned on (step S20), the jam indication is turned off (step S21), and a series of operations starting with paper feed are performed again from the beginning.

On the other hand, when no jams occur, but video inputs are interrupted during copy operation by disconnection of the input connector, troubles with video sources such as a VTR or a video disk, interruption of the power supply or the like and, as a result, when a lack of synchronizing signals HD is detected by the detection circuit 58 (step S11), then position of the line or column which has caused failure of the horizontal synchronizing signals HD is stored (step S22). At the same time, paper feed and copy operations are inhibited (step S23). In addition, failure of the synchronizing signals is indicated by the display circuit 64 (step S24). When troubles are eliminated by reconnection of the video signal input connector or the like and the reset switch 67 is then turned on (step S25), the failure indication is turned off (step S26) and an input to the start switch 66 or the stop switch 68 is awaited (steps S27, S28). When the start switch 66 is turned on (step S27), copy operation starts at the position on the recording paper where copy operation has stopped because this abnormality is not an irrecoverable problem such as a jam. In more detail, when the start switch 66 is turned on (step S27), count of the number of sampled lines or columns starts with the first line or column thereof (step S29). When the count value arrives at the line or column which has caused the lack of horizontal synchronizing signals HD and which has been stored at the step S22 (step S30), copy operation restarts (step S9).

Figure 2:
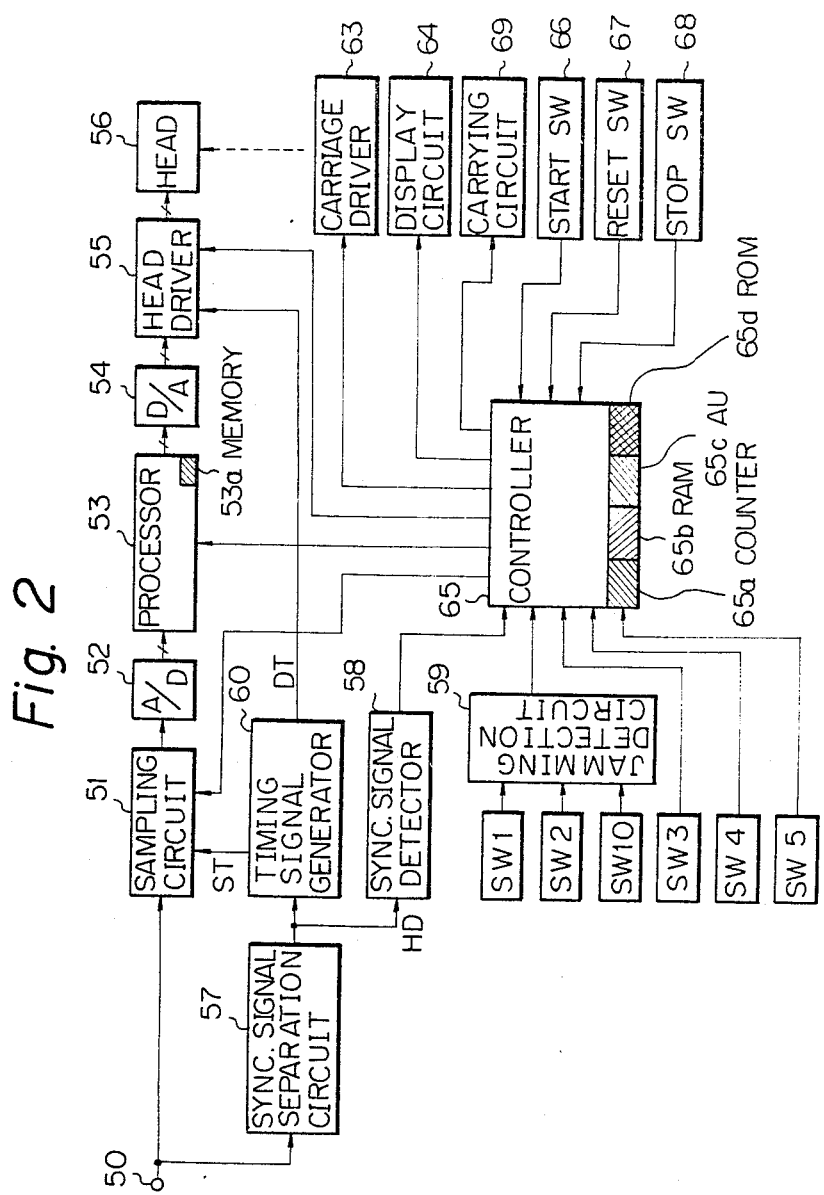
FIG. 2 is a block diagram of the electric circuit included in a printer of FIG. 1.

Storage of the line or column which has caused the lack of horizontal synchronizing signals HD at the step S22 and count of the number of sampled lines or columns at the step S29 are performed using a counter 65a and a RAM 65b included in the control circuit 65 (FIG. 2). Also, determination of coincidence at the step S30 is performed using an internal arithmetic and logic circuit 65c (FIG. 2).

On the other hand, when the stop switch 68 is turned on (step S28), copy operation restarts from the beginning, so that discharge or withdrawal of the recording paper begins (step S17). After discharge or withdrawal of the paper, the discharge or withdrawal operation stops (steps S31, S32) and control returns to the initial state.

As described above, when synchronizing signals fail, it is possible to restart copy operation as it was last or to restart copy operation from the beginning, thereby avoiding useless prints.

The program which defines the operation flow described above is stored in an internal ROM 65d of the control circuit (FIG. 2).

What we claim is:

1. A video image recording apparatus for recording an image corresponding to a video signal having synchronizing signals, comprising:
    input means for receiving said video signal having synchronizing signals;
    sample means connected to said input means for sampling the video signal, said sample means including a memory for storing sampled video signals representing a portion of said image;
    record means for recording an image corresponding to the output of said sample means simultaneously with sampling said video signals;
    detection means connected to said input means for detecting the synchronizing signals; and
    control means responsive to said detection means for inhibiting the recording operation of said record means when an absence of said synchronizing signals is detected.

2. A video image recording apparatus according to claim 1, wherein said record means includes:
    a recording head; and
    carrier means for carrying a record medium to said recording head, and wherein said control means inhibits operation of said head and said carrier means.

3. A video image recording apparatus according to claim 2, wherein said record head includes an ink jet head.

4. A video image recording apparatus according to claim 3, wherein said record means further includes:
    a drive circuit for driving said record head on the basis of the output of said memory of said sample means.

5. A video image recording apparatus according to claim 1, wherein said sample means further includes:
    a sample and hold circuit for sampling and holding the video signal; and
    an analog to digital converter for converting the signal sampled and held by said sample and hold circuit and for producing an output; and
    wherein said memory stores the output of said analog to digital converter.

6. A video image recording apparatus according to claim 5, wherein said memory has a capacity to store sampled video signals for one to several lines or columns of said video image.

7. A video image recording apparatus according to claim 6, wherein said sample means further includes:
    a digital to analog converter for converting the output of said memory and producing an output and wherein said record means stores the output of said digital to analog converter.

8. A video image recording apparatus according to claim 1, further including:
    restart means connected to said control means for restarting the recording operation of said record means after the recording operation has been inhibited.

9. A video image recording apparatus according to claim 8, wherein said restart means includes:
    first means for storing the sample position when said absence of the synchronizing signals has been detected;
    second means for identifying the location of the sample position; and
    third means for issuing an instruction to restart record operation when the sample position location identified by second means coincides with the sample position stored in said first means.

* * * * *